United States Patent [19]
Schwarze et al.

[11] Patent Number: 5,366,562
[45] Date of Patent: Nov. 22, 1994

[54] METHOD FOR REMOVING VISCOELASTIC CONTAMINANTS FROM HOLES

[75] Inventors: Heinz J. Schwarze, Northeim; Robert Kopp, Rollhausen, both of Germany

[73] Assignee: Continental Aktiengesellschaft, Hanover, Germany

[21] Appl. No.: 923,876

[22] PCT Filed: Feb. 7, 1991

[86] PCT No.: PCT/DE91/00098
§ 371 Date: Oct. 14, 1992
§ 102(e) Date: Oct. 14, 1992

[87] PCT Pub. No.: WO91/12124
PCT Pub. Date: Aug. 22, 1991

[30] Foreign Application Priority Data
Feb. 16, 1990 [DE] Germany .................. 4004837

[51] Int. Cl.⁵ .................. B08B 3/02; B29C 47/08
[52] U.S. Cl. .................. 134/22.12; 134/10;
134/22.15; 134/22.18; 134/111; 134/169 R;
134/102.2
[58] Field of Search .................. 134/10, 22.1, 22.11,
134/22.12, 22.15, 22.18, 37, 111, 169 R, 102.2

[56] References Cited
U.S. PATENT DOCUMENTS

| | | | |
|---|---|---|---|
| 3,799,173 | 3/1974 | Kamen | 128/351 |
| 3,799,178 | 3/1974 | Anderson et al. | 134/58 R |
| 4,366,003 | 12/1982 | Korte et al. | 134/18 |
| 4,899,697 | 2/1990 | Franklin et al. | 122/379 |

FOREIGN PATENT DOCUMENTS

| | | | |
|---|---|---|---|
| 0062111 | 6/1989 | European Pat. Off. | B05B 17/04 |
| 0214749 | 11/1990 | European Pat. Off. | B08B 3/02 |

OTHER PUBLICATIONS
Patent Abstracts of Japan; vol. 7, No. 246 (M-391), Nov. 2, 1983; 58-132562; Aug. 6, 1983.

*Primary Examiner*—Michael Lewis
*Assistant Examiner*—Thomas G. Dunn, Jr.
*Attorney, Agent, or Firm*—Robert W. Becker & Associates

[57] ABSTRACT

The invention relates to a method for the removal of viscoelastic rubber residues from deep holes. The cleaning tool is suggested in the form of a jet of fluid droplets. The fluid is accelerated by a high-pressure pump and a narrow valve to a velocity above the speed of sound of the material to be removed. The distance between the valve and the hole to be cleaned is made greater as the valve cross-section is made smaller in relation to the cross-section of the hole to be cleaned.

9 Claims, 1 Drawing Sheet

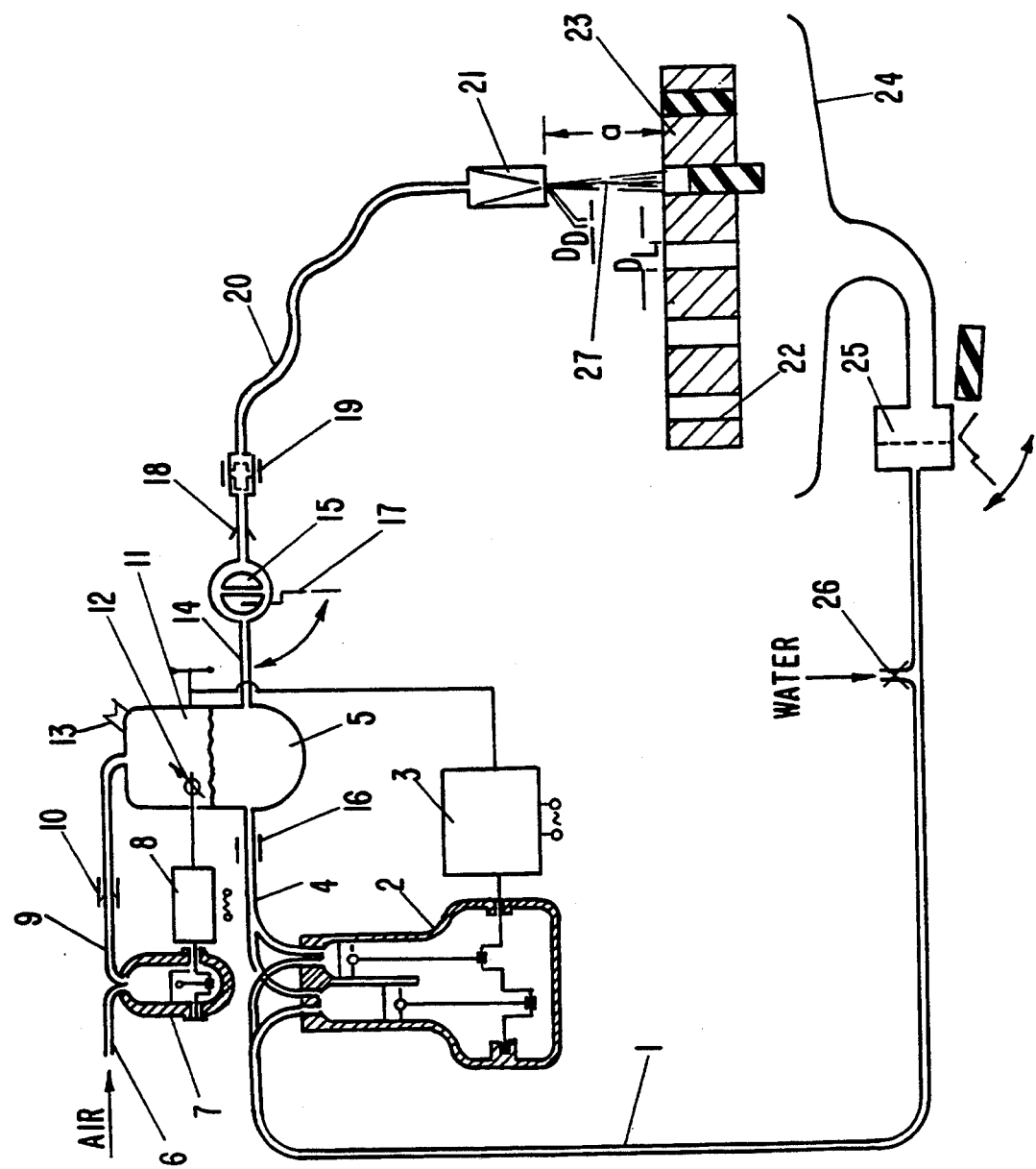

METHOD FOR REMOVING VISCOELASTIC CONTAMINANTS FROM HOLES

BACKGROUND OF THE INVENTION

The invention relates to a method for removing tacky plug-shaped rubber residues from holes having a depth that is greater than their diameter, especially from holes in strainer plates, whereby the rubber is forced out in one direction such that it essentially maintains its plug shape. A particular difficulty lies in the fact that the holes due to their great depth provide a large adhesive wetting surface for the tacky rubber while at the same time only a small engaging surface for the pressing tool is provided. This problem is further enhanced by the fact that the rubber has a substantially reduced stiffness as compared to the outer walls, usually comprised of steel, of the holes to be cleaned. This results in a steep shearing tension drop over the depth of the hole at the contact surface rubber/outer wall of the hole. While in the direct vicinity of the pressing tool the shearing tension is still sufficient for a fast removal, at the opposite end of the hole the adhesion is increased due to the increased inner pressure of the rubber resulting from the pressing tool. In this technical context, the rubber must be considered a very tacky fluid. The increased rubber inner pressure acts, as for a fluid, on the mantle surface of the hole, perpendicular to the force generated by the tool. This is the reason for the fatal effect that when employing a pressing stamp the pressing resistance is actually increased. Depending on the diameter of the hole, the tackiness of the rubber, and the stiffness of the rubber, the critical depth of the hole may be determined which defines the upper limit for spontaneous removal of the rubber residues by pressing because from there the effect increasing the pressing resistance takes over. This critical hole depth is in general surpassed for strainer plates the cleaning of which is primarily addressed in the invention. Conventional strainer plates have hole depth between 25 and 40 mm for a diameter of the hole between 6 and 12 mm.

According to the prior art, a forcing-out of the plug-shaped rubber residues from deep holes is not possible as a fast method step. At most, the rubber plugs may be forced to very slowly flow out of the deep holes. The time for this flowing process is within the range of hours or even days for the commonly used dimensions of the holes of strainer plates, and this process is thus unsuitable for economical mass production. Common strainer plates comprise approximately 300 to 500 holes for the rubber to be pressed therethrough.

From German Offenlegungsschrift 33 35 467 a device is known with which the holes may be cleaned by employing high-pressure media jets. The exit opening for the high-pressure medium in a known manner should be placed as closely as possible to the surface to be cleaned and, for this purpose, should be movable with a lance into the boring.

The method based on this device is suitable for removing rubber residues due to the viscoelastic properties of the rubber because the fluid jet energy is essentially absorbed by damping. Only brittle or fluid-soluble materials may be removed. Furthermore, the presence of a hole is presupposed in order to be able to introduce the lance. The method is thus only suitable for enlarging the free cross-section of holes, but not for generating a free cross-section.

The German Gebrauchsmuster 88 06 774 shows a similar device with a lance from which a pressure fluid jet should exit laterally. In order to overcome the problem of insolubility of contaminants to be removed, here oils, grease, and lubricants, in the used liquid, the use of detergents is taught. The use of detergents, however, is not recommended for the problem to be solved with the invention because the valuable material to be removed could not be used any longer as a raw material, but would become refuse. Also, to complicate matters further, the detergent must be cleaned from the walls of the hole in a second cleaning step. Furthermore, as pointed out above in the aforementioned prior art, a lance cannot be introduced into the hole because it is completely plugged with rubber instead of the wall of the hole being merely covered with rubber.

In the past, strainer plates have been cleaned by boring. With this method, a hole may be cleaned within approximately 10 seconds. In addition to the considerable bore tool wear the method further suffers especially from the time-consuming centering of the bore tool axis with respect to the center of the hole since the bore tool must have an outer diameter corresponding almost to the inner diameter of the hole to be cleaned in order to provide an acceptable cutting effort. When the centering is flawed, in addition to the bore tool the walls of the hole would be abrasively loaded. Due to the considerable positioning efforts it is hardly possible to clean a plurality of holes simultaneously by boring out the rubber. For a strainer plate with, for example, 400 holes the cleaning process by boring requires approximately one hour.

A further disadvantage of the boring method lies in the fact that the personnel requirements are high. The shavings removal and the cutting edge quality of the boring tool must be constantly checked, the boring tool must be removed, ground, and reinserted, and the boring tool cooling must be controlled.

It is therefore an object of the invention to provide a less sensitive method for cleaning deep holes from rubber residues, especially holes of strainer plates, which may also to a greater extent be automatized.

SUMMARY OF THE INVENTION

The object is inventively solved by forcing the rubber residues out by a fluid jet (liquid jet) whereby the fluid jet (liquid jet) is accelerated by employing high pressure within the fluid jet valve such that the velocity v with which the fluid (liquid), respectively, the liquid droplets hit the rubber residues is greater or equal to the speed of sound c of the rubber to be removed. For this purpose, the diameter $D_F$ of the fluid jet is advantageously selected such with respect to the inner diameter $D_L$ of the holes to be cleaned that $D_F$ is 1 to 1.5 times the value of $D_L$. The wider the jet, the lower are the requirements with respect to the precision of the jet centering relative to the center of the hole.

The diameter $D_F$ of the fluid jet is herein defined as the diameter of the cross-section of the fluid jet through which 95% of the total fluid volume passes. Such a definition which might be considered somewhat bothersome is necessary because the fluid jet which flows without enclosure does not have sharp surfaces relative to the non-flowing air but forms a turbulent transition zone in which the fluid jet is transformed into fluid droplets with interposed air inclusions that are carried away with the jet. The time-average volume stream per area decreases sharply within the jet with increasing distance from the jet center line within the boundary area, but without any discontinuity.

In cases in which the rubber to be removed has a higher density $\rho_K$ than the fluid, the velocity should be at least as great as the product of the speed of sound C in the rubber to be removed times the density ratio $\rho_K/\rho_F$.

A determining factor is that for the removal of the rubber the extremely unfavorable viscoelastic properties may be overcome by such high impact velocities. For a certain insertion depth the removal tool provides fluid which proceeds the induced pressure wave so that the rubber essentially does not have time to give way by deformation. Instead, it must break like a brittle material. While in a velocity range below the speed of sound a fluid jet will essentially only wash out the contaminants to be removed due to the attack at the flow resistance of the contaminant, the present method essentially provides for a brittle impact removal.

The basic difference is also demonstrated by the fact that the cleaning effect of the suggested supersonic jet essentially does not depend any longer on the solubility of the rubber to be removed in the fluid used for removal. In the subsonic range the fluid used for removal must in contrast be able to dissolve the rubber material to be removed, respectively, must be provided with substances such as soap, alcohol, acetone etc. which induce solubility. The transition into the supersonic range provides a particularly environment-friendly method which is characterized by the use of water as the fluid for removal. Due to the elimination of any solvent such as soaps etc. the waste water reclamation is simplified two fold: fold: On the one hand, the solvent must not be removed by expensive chemical methods, and on the other hand, the rubber residues may be removed by simply mechanically filtering the waste water due to the insolubility of the rubber in water. In an advantageous development of the inventive method a closed water circuit is used, i.e., the collected and filtered waste water is recycled into the pressure pump.

In the beginning stages of the invention the inventors presupposed that the water jet valve must have at least a diameter $D_D$ as great as the inner diameter $D_L$ of the holes to be cleaned. Based on a speed of sound of 60 meters per second in a commonly used rubber mixture, a ratio of rubber density to fluid density (water density) of 1.3, and a valve diameter $D_D$ of 10 mm a power of the water jet of at least 18.6 KW was considered necessary. In view of the flow losses a required drive power of 40 KW was calculated. The idea of the water jet cleaning method seemed initially uneconomical, on the one hand, due to the extreme drive power and the expensive, extremely large high pressure pumps, and, on the other hand, due to the erosion at the strainer plate to be cleaned if such a water jet hits the plate adjacent to the hole to be cleaned. However, this might only be prevented under great difficulties because such an inertia-rich water jet could not be simply shut off for the time span needed for positioning the valve at the next hole to be cleaned. In this hopeless situation where the project was to be abandoned, one inventor had the idea to use conventional, substantially smaller high pressure pumps which for a volume flow between 50 ml/sec and 150 ml/sec generate a high pressure within the fluid line between 150 and 190 bars. The high flow velocity which according to the invention lies above the speed of sound of the rubber is achieved with an especially narrow valve of at most 1.6 mm in diameter, preferably 1.0 to 1.5 mm. The diameter $D_D$ of the water jet valve should thus be substantially smaller than the diameter $D_L$ of the holes to be cleaned. While it is commonly expected that the effect of any rays is more perfect if the substrate to be irradiated is closer to the radiation source, in the present case the best effect is achieved only at a considerable distance between the strainer plate to be cleaned and the fluid jet valve. For a more closely tested hole diameter $D_L$ of 10 mm in one particular embodiment and a valve diameter $D_D$ of 1.3 mm the optimum distance was 210 mm. When $D_D$ is smaller or $D_L$ is greater, the distance must be enlarged and vice versa. Due to the surprisingly simple measure of spacing, the exact jet diffusion is achieved that at the point of contact covers the entire hole cross-section. According to this further embodiment of the invention, the rubber to be removed is seemingly not hit by a continuous fluid jet, but by a salvo of discreet water droplets.

A device for performing the inventive method comprises a fluid high pressure pump and a fluid valve. In a preferred embodiment an actuating valve is provided downstream of the high pressure pump which allows to interrupt the jet during the positioning of the valve at the next hole, and between the pump and the valve a pressure storage means, preferably pneumatic, is provided.

Such a device is represented as one embodiment in the FIGURE.

BRIEF DESCRIPTION OF THE DRAWINGS

The only FIGURE shows a schematic representation of the inventive cleaning device with water recirculation.

DESCRIPTION OF PREFERRED EMBODIMENTS

The represented cleaning device employs as the fluid for cleaning water without any cleaning additives. Via the feed water line 1 the two cylinder water high-pressure pump 2 driven by a motor 3 sucks in water and guides it under high pressure into the high-pressure line 4. The high-pressure line 4 opens via a check valve 16 into a pneumatic storage means having in its lower portion pressurized water and above compressed air. Via the air inlet 6, the air pump 7 driven by a motor 8, the compressed air line 9, and the air check valve 10, a compressed air cushion 11 is generated within the upper portion of the pneumatic storage means 5. The pressure of this compressed air cushion is measured by a pressure gauge 12 used to control the motor 8 of the air pump 7 so that the air pressure within the compressed air cushion 11 is essentially constant over time. The motor 3 of the high pressure water pump 2 is controlled according to the water level of the storage means 5. For safety reasons a pressure relief valve is provided at the upper end of the pneumatic storage means 5.

From the pneumatic storage means 5 which serves as a buffer a pressure water line 14 leads to the shut-off valve 15 which may be actuated by a lever 17. Connected to the shut-off valve 15 is a pulsating suction valve 18 which, when the shut-off valve 15 is closed, allows air to enter the hose line 20 because water is still flowing due to its inertia within the hose line 20 extending to the calibrated valve 21, thereby allowing the remaining water within the hose line 20 to exit essentially without delay. Upon opening the shut-off valve 15 the pulsating suction valve closes the air supply.

Based on the water flow velocity 0 at the moment of opening the valve the length of the hose 20 serves as the acceleration distance for the column of water before it enters the calibrated valve 21. For this purpose, a certain line length between the shut-off valve 15 and the calibrated valve 21 is necessary as a function of the flow cross-section before the calibrated valve 21 and as a function of the pressure within the pneumatic storage means 5.

The flexible hose 20 is flanged via a hose coupling 19 to the pulsating suction valve 18 which itself is flanged to the shut-off valve 15. The elasticity of the hose 20 effects in addition to the pneumatic storage means 5 a fine smoothing of the timely pressure behavior of the entire high pressure side of the device. The flexibility of the hose 20 is also used to allow a positioning movement of the calibrated valve with essentially rigidly arranged parts 1-19 and a rotational support of the strainer plate 23 with its holes 22 plugged by rubber and to be cleaned so that in sequence all of the individual holes 22 of the strainer plate 23 may be cleaned. The advancing device is not represented in the schematic representation of the FIGURE. Within the calibrated valve 21 the flow cross-section is reduced from approximately 16 mm within the holes 20 to a diameter $D_D$ of 1.3 mm. This results in a strong acceleration of the water droplets within the water jet 27. The cleaning effect of the water jet 27 is not impaired by the fact that this water jet contains a substantial amount of air.

Between the outlet opening of the calibrated valve 21 and the upper side of the strainer plate 23 to be cleaned the distance a is defined which in the exemplary embodiment is 210 mm. Accordingly, an optimal diffusion of the water jet 27 results for the complete cleaning of the holes 22 having a diameter $D_L=10$ mm. The water pressure within the high pressure side of the device is 180 bars in the exemplary embodiment. After passing through the holes 22 to be cleaned the almost entirely relaxed water jet 27 is collected in a waste water funnel 24 and guided to a filter 25 where the rubber which has been removed by the brittle impact method and which is not dissolved in water is removed. After an intermediate drying the rubber residues may be introduced into virgin rubber mixtures. The waste water from which the rubber residues have been removed is again used as feed water for the high pressure pump 2 and is only replaced with fresh water through water supply 26 to the minimal extent that water has been lost by vaporization and the formation of fine sprays. Essentially a closed water circuit and a closed rubber circuit are provided.

The inventive method requires only approximately one tenth of the time for cleaning a strainer plate as compared to the boring method. At the same time, the inventive method may be easily automatized because due to the flexible hose line 20 the water valve 21 is easier to position than a boring tool and because the valve must be calibrated only occasionally as compared to the boring tool which must be frequently reground. Furthermore, an extended service life of the strainer plates is achieved because the edges of the holes 22 to be cleaned are only to a small extent abrasively loaded during cleaning. The increased initial expenditure for the inventive device for performing the inventive method is quickly amortized due to the reduced operating costs.

Despite the fact that the invention was initially designed to remove rubber residues from holes having a depth which is at least twice as great as their diameter, the invention may also be used for cleaning holes from other substances which are similarly tacky, elastic and viscous. The only determining factor is that the problems stemming from the viscoelasticity of the substance are overcome by the fact that the material to be removed can no longer evade the tool used for removal because inventively it impacts with supersonic velocity. Therefore, for the cleaning of holes from thermoplastic elastomers the equivalent problem with an equivalent solution results. The speed of sound within thermoplastic elastomers is sufficiently low so that it can be surpassed by a water droplet jet.

In contrast to the energy-consuming subcooling process, a method for removal of material based on its brittle properties is provided which operates at low energy costs.

The present invention is, of course, in no way restricted to the specific disclosure of the specification and drawings, but also encompasses any modifications within the scope of the appended claims.

What we claim is:

1. A cleaning method for removing tacky, plug-shaped residues of an elastoplastic material from holes having a depth greater than their inner diameter $D_L$, whereby the elastoplastic material is forced out in one direction while essentially maintaining its plug shape; said method comprising the steps of:
   accelerating a liquid jet by employing high pressure of between 150 to 190 bar within a fluid jet valve to a velocity v with which liquid droplets in said liquid jet hit the residues of elastoplastic material, with $v \geq c$, c being the speed of sound of the residues of elastoplastic material;
   forcing out the residues of elastoplastic material by said liquid jet;
   wherein the residues of elastoplastic material have a density $\rho_K$ and the liquid of said liquid jet has a density $\rho_F$ with $\rho_K > \rho_F$; and
   further comprising the step of adjusting said liquid velocity v and said speed of sound c according to the equation $$v \geq \frac{\rho_K}{\rho_F} \times c.$$

2. A cleaning method according to claim 1, further comprising the step of setting a diameter $D_F$ of said liquid jet; through which 95% of the total liquid volume passes, to 1.0 to 1.5 times said inner diameter $D_L$ of the holes.

3. A cleaning method according to claim 1, further comprising the steps of:
   applying a pressure of 150 to 190 bar in a fluid line leading to said fluid jet valve during operation; and
   adjusting the liquid volume stream to said fluid jet valve to between 50 and 150 ml/sec.

4. A cleaning method according to claim 3, wherein the inner diameter $D_D$ of said fluid jet valve is 1 to 1.5 mm; further comprising the step of adjusting a distance between said fluid jet valve and the holes to 180 to 240 mm when said inner diameter $D_L$ of the holes is approximately 10 mm.

5. A method according to claim 1, wherein the liquid of said liquid jet is water.

6. A method according to claim 5, wherein the water is free of substances that induce the solubility of the residues of elastoplastic material; further comprising the step of mechanically filtering the residues of elastoplastic material from the water.

7. A method according to claim 6, wherein said substances are soaps, alcohols, and acetone.

8. A method according to claim 6, further comprising the steps of:

providing a closed water circuit;
collecting the water of the liquid jet; and
recycling the collected and filtered water.

9. A method according to claim 1, wherein the residues of elastoplastic material are insoluble in the liquid of said liquid jet.

* * * * *